May 3, 1927.

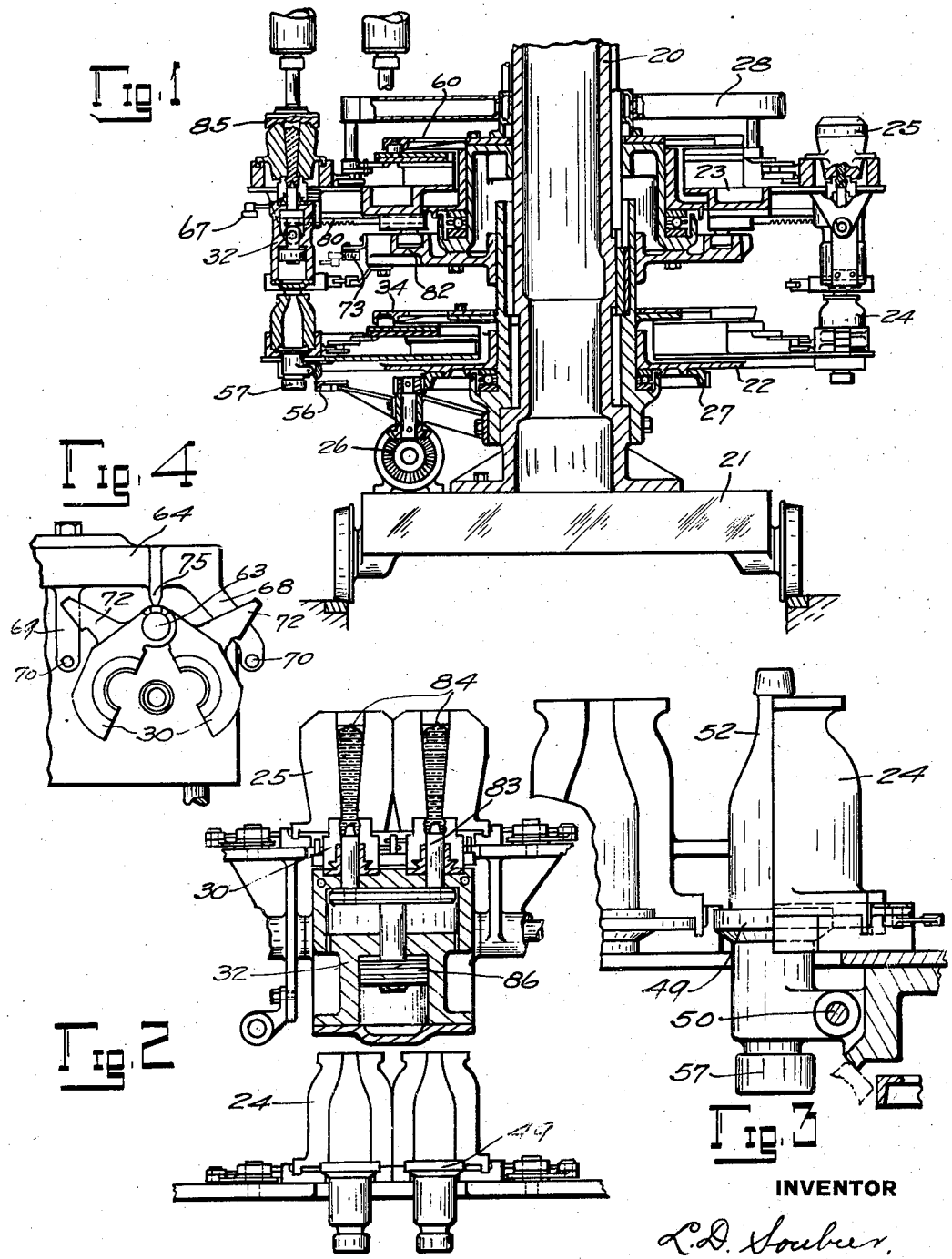

L. D. SOUBIER

GLASS FORMING MACHINE

Original Filed Nov. 15, 1920    4 Sheets-Sheet 2

1,626,703

INVENTOR
L. D. Soubier,
By J. F. Rule.
His attorney.

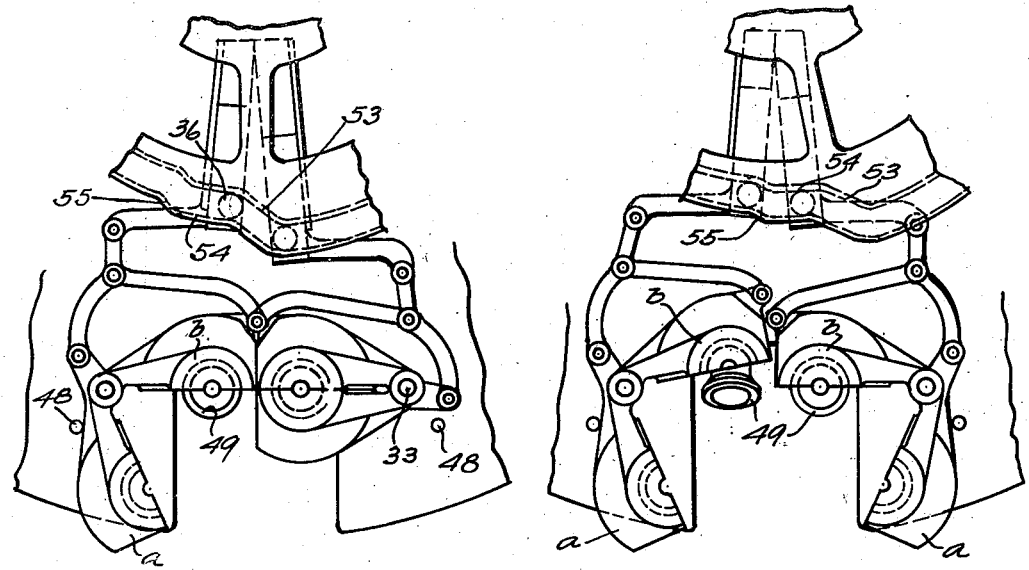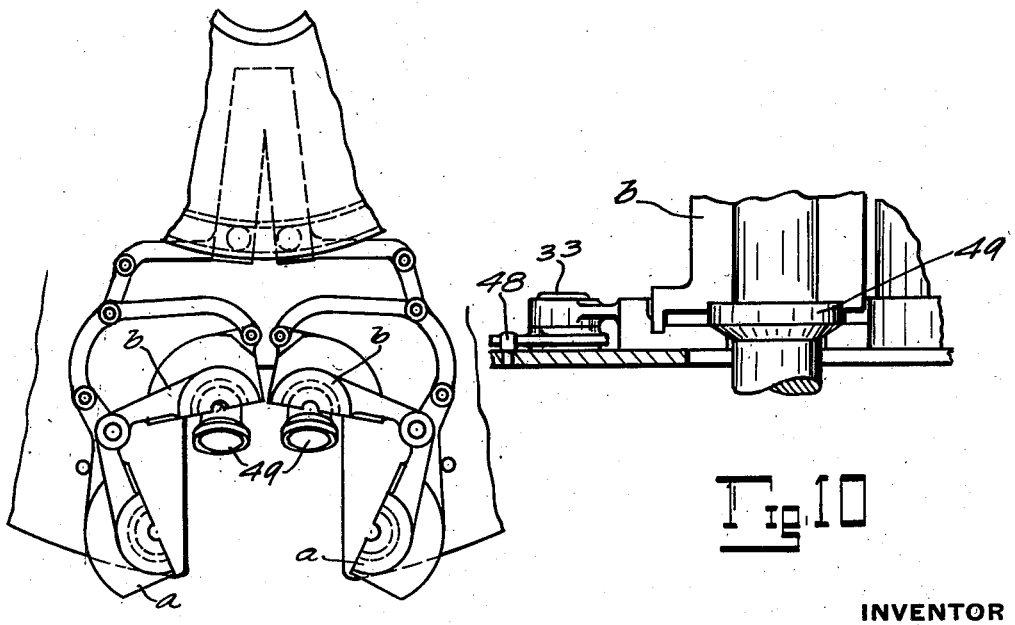

May 3, 1927.
L. D. SOUBIER
1,626,703
GLASS FORMING MACHINE
Original Filed Nov. 15, 1920   4 Sheets-Sheet 4
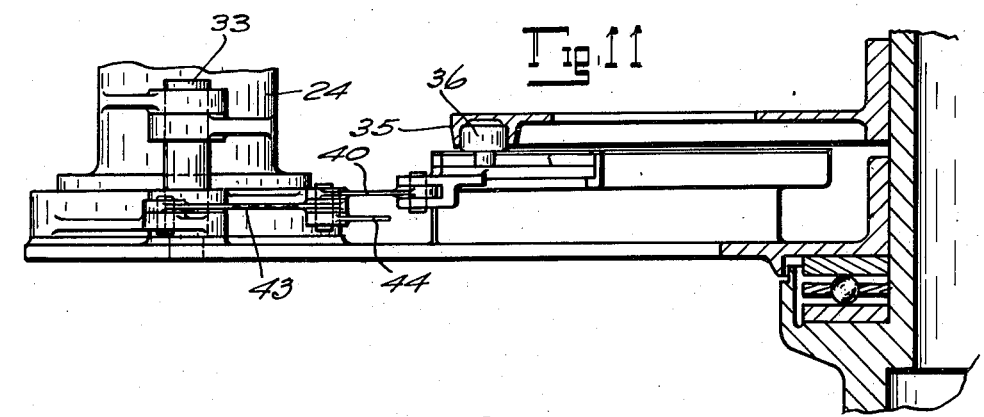
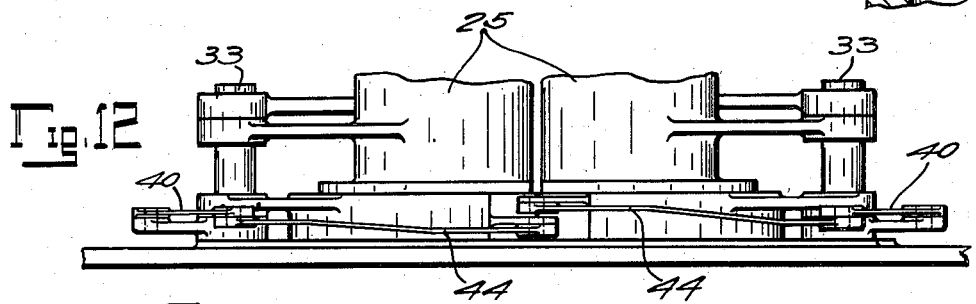
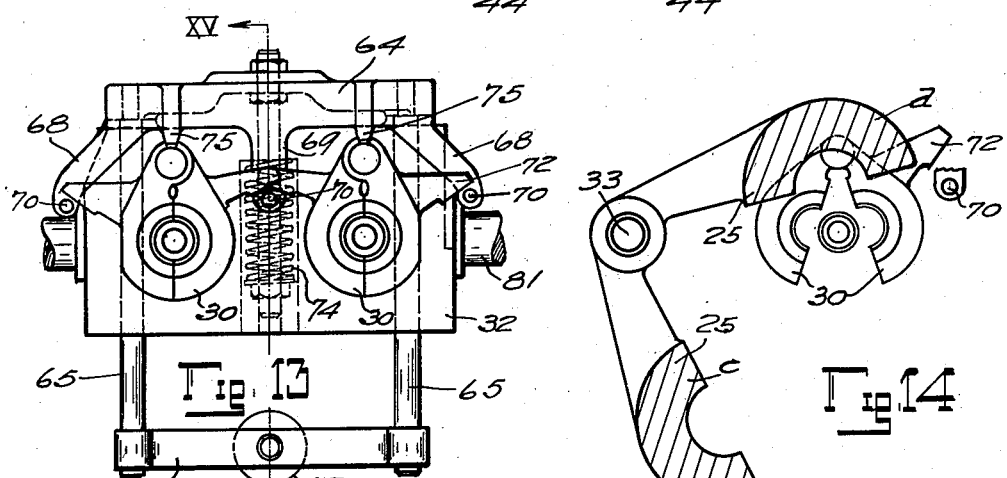
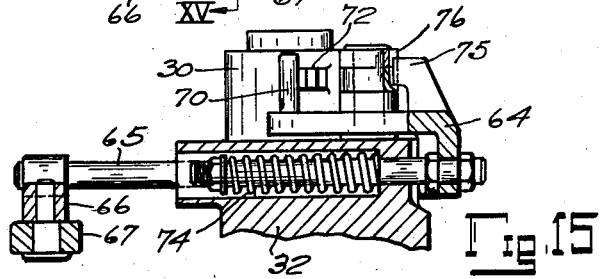
INVENTOR Patented May 3, 1927.

1,626,703

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS-FORMING MACHINE.

Application filed November 15, 1920, Serial No. 424,197. Renewed March 23, 1926.

My invention relates to glass forming machines, particularly of the type in which the molds are arranged in an annular series or series of groups on a mold carriage rotatable about a vertical axis. The main features of novelty relate to the construction and arrangement of the molds in groups, each adapted to receive a plurality of mold charges at a time, the several forming operations being performed concurrently on the charges in each group.

An object of the invention is to provide an improved construction and arrangement wherein the several molds or mold cavities of each group are arranged circumferentially or one in advance of another in the same path of rotation, while permitting the molds to be placed in close proximity. In machines at present in general use each mold comprises horizontally separable sections meeting in a vertical plane radial to the mold carriage, so that the molds are opened by separating the mold sections laterally, requiring considerable space between successive molds. This precludes a close arrangement of the mold cavities in groups, or an arrangement of a plurality of mold cavities circumferentially of the mold carriage in a single mold. The present invention provides a novel construction of the molds and operating mechanism, permitting such a grouping and arrangement of the mold cavities. The invention further provides a novel construction by which the several articles formed in the group of molds may be discharged successively as they reach the same discharging position. The invention further provides a novel form of neck mold and means for actuating it and for locking it in its open and closed positions.

Other features and advantages of the invention will appear hereinafter.

In the accompanying drawings, which illustrate a machine constructed in accordance with the principles of my invention,—

Figure 1 is a sectional elevation of the machine.

Figure 2 is a section showing a group of molds and the transfer head by which the parisons are transferred from the blank molds to the finishing molds.

Figure 3 is a view showing a finishing mold.

Figure 4 is a plan view of a neck mold locked in open position.

Figures 5, 6:
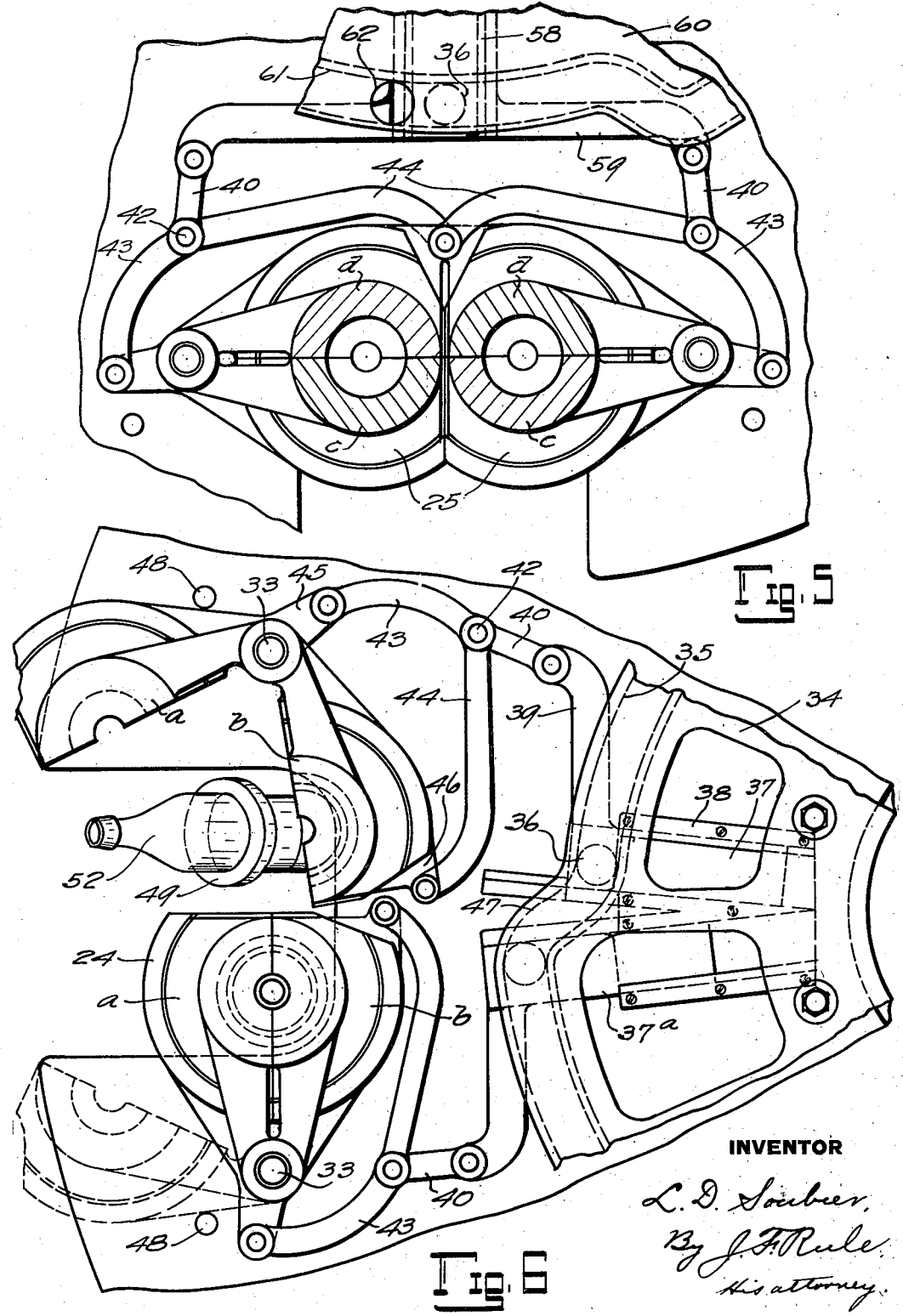
Figure 5 is a part sectional plan view of a pair of blank molds.
Figure 6 is a plan view of a pair of finishing molds.

Figures 7, 8 and 9 are diagrammatic plan views of a pair of finishing molds, showing the same at different steps in the opening movements. Figure 7 shows a section of one mold open, the blown article being supported in the other section. Figure 8 shows the first mold fully opened and one section of the second mold opened. Figure 9 shows both molds of the pair fully opened and the mold bottoms tilted to discharge the blown articles.

Figure 10 is a fragmentary sectional elevation showing a finishing mold bottom held up by one of the mold sections.

Figure 11 is a part sectional elevation showing a mold opening device.

Figure 12 is a rear view of the blank molds and operating means therefor.

Figure 13 is a plan view of a pair of neck molds and the transfer head.

Figure 14 is a part sectional view of a blank mold and neck mold.

Figure 15 is a section at the line XV—XV on Figure 13.

The present application discloses certain subject-matter of invention also disclosed in my co-pending application Serial Number 424,198, filed November 15, 1920, Glass forming apparatus.

Referring particularly to Figure 1, I have shown my invention in connection with a machine similar in construction to that disclosed in the patent to Joseph B. Graham, 1,405,204, January 31, 1922. This machine comprises a central stationary column 20 mounted on a base 21. The mold carriage comprises lower and upper mold tables or spiders 22 and 23 on which are mounted respectively the finishing molds 24 and blank molds 25. The mold carriage is rotated continuously by a motor 26 connected to the carriage through a train of gears including an annular gear 27 fixed to the lower mold table. Air for blowing the charges of glass to form the finished articles, is supplied through a distributing head or drum 28 and connections (not shown) which may be substantially the same as disclosed in the Graham patent hereinbefore mentioned.

The machine comprises a number of units or heads arranged at equal intervals around the axis on the machine and each comprising a group of molds including blank molds 25, neck molds 30 in register with the blank molds, and finishing molds 24. Each unit also comprises a transfer head 32 carrying the neck molds and which is rotatable about a horizontal axis to swing the parisons downward from the blank molds into position to be enclosed by the finishing molds. Referring particularly to Figure 6, which shows the finishing molds 24 of one group, each mold of the pair here shown comprises an outer section *a* and an inner section *b* hinged to swing about a pivot 33, said pivots being in or near the circumferential path of travel of the mold centers. In other words, the pivots 33 are so positioned that the vertical plane in which the mold sections meet is about perpendicular to the radius of the mold carriage at the mold center.

The finishing molds are opened and closed by means of a stationary cam 34 having a cam groove 35 in which runs a roll 36 on a slide block 37 mounted to reciprocate toward and from the axis of the carriage in a guideway 38. The slide block is provided with a laterally extending arm 39 connected through a link 40 to a pivot pin 42 to which are also connected links 43 and 44. The link 43 is connected to an arm 45 integral with the outer mold section *a*. The link 44 is connected to a lug 46 on the inner mold section *b*. A second slide block 37ª has similar operating connections with the second mold. The slide blocks and their connections with the two molds are symmetrically arranged. As the molds advance and the foremost cam roll 36 enters the inclined portion 47 of the cam groove, the slide 37 is drawn radially inward. During the initial portion of this inward movement the outer section *a* of the forward mold is swung outward until arrested by a stop 48. It will be noted that during this opening movement of the section *a* the link 44 swings idly, the pull of the link 40 on the pivot 42 being in a direction tending to hold the mold section *b* in its closed position. After the section *a* is arrested, the continued movement of the slide 38 operates through the link connections to swing the mold section *b* inward a short distance to the position shown in Figure 6.

A bottom plate 49 mounted to tilt about a horizontal pivot 50 (see Fig. 3) is held up by the finishing mold while the latter is closed. When the mold section *a* swings open, the bottom plate is still held by the section *b* until the latter is swung inward as above described, thereby releasing the bottom plate and permitting it to tilt by gravity and discharge the bottle 52 or other article which has been blown in the mold.

After the advanced mold has opened and discharged its bottle, the slide 37ª of the following mold is operated by the cam section 47 to open its mold in the same manner, namely, by first swinging the outer section *a* outward to the dotted line position (Fig. 6) and then swinging the inner section inward sufficiently to release the mold bottom. It will be noted that the second mold has now been advanced to the same discharging position as the first mold. That is, all of the molds will discharge their bottles at the same point.

Figures 7 and 8 show a somewhat modified form of cam groove for controlling the opening and closing of the finishing molds. This comprises an inclined portion 53 for opening the outer mold section *a*, a dwell portion 54 along which the cam roll 36 runs after the outer mold section is opened, and an inclined portion 55 which operates the inner mold section *b* to release the mold bottom. With this arrangement the mold bottom can be held up while traveling through any desired distance after the mold section is opened, depending on the length of the dwell portion 54 of the cam. Figure 7 shows the advanced mold opened but with the mold bottom held up by the inner mold section. Figure 8 shows both molds open and the first mold bottom tilted. Figure 9 shows the two molds open and both mold bottoms in tilted position. After the bottles have been discharged the mold bottoms are lifted by a stationary cam 56 engaging rolls 57 on the mold bottoms, thereby permitting the molds to close and hold said bottoms until again brought around to discharging position.

The blank molds 25, as shown in Figure 5, are opened and closed by mechanism similar in construction and operation to that of Figure 6. In this case, however, a single slide 58 is employed to actuate the molds. Said slide comprises a yoke 59 connected to the links 40. As the slide 58 is drawn inward by its cam, it operates through the linkage to swing the outer mold sections *c* simultaneously to open position and then to swing the inner mold sections *d* inward, thereby releasing the neck molds 30 so that they are free to rotate with the transfer head 32 and swing the parisons downward into the open finishing molds. The slide 58 is actuated by a stationary cam 60 having a cam groove 61 in which the roll 36 runs. An opening 62 in the cam plate permits access to the roll 36.

The neck molds 30 are arranged in pairs on the transfer head 32 and each comprises horizontally separable sections mounted to swing about a pivot pin 63. The neck molds are opened and closed by means of a frame mounted to reciprocate in the head 32, said frame comprising a yoke 64, rods 65 attached thereto and slidable in the head 32, and a transverse bar 66 connecting said rods and carrying a cam roll 67. The yoke 64 is provided with arms 68 and 69 carrying pins 70 to engage lugs 72 projecting from the neck mold sections. When the transfer head 32 has been inverted to swing the parisons downward into the finishing molds, the cam roll 67 engages a cam 73 (Fig. 1) and actuates the frame comprising the yoke 64, causing the pins 70 to engage the lugs 72 and open the neck molds. The roll 67 is then released by passing beyond the cam so that the yoke 64 is thrown inward to the Figure 4 position by means of a spring 74 (see Fig. 15). This causes detents 75 carried on the yoke to bear against the open mold sections, thereby holding the neck molds in open position. The neck molds remain open until positively closed by the blank mold, which, as shown in Figure 14, is so shaped that the closing movement of the blank mold causes it to engage and close the neck mold. The neck molds are locked in closed position by the detents 75 which under the influence of the spring 74 are held in notches 76 in the mold sections.

The transfer head 32 is rotated about a horizontal axis by means of a rack 80 running in mesh with a pinion on a shaft 81. The rack is reciprocated by a stationary cam 82. Plungers 83 (Fig. 2) serve to form initial blow openings in the glass blanks 84. The two charges or gobs of glass are preferably simultaneously introduced into the pair of molds 25. Said gobs may be supplied by an automatic feeder. After the charges are dropped in the molds, a blowing head 85 (Fig. 1) is moved downward onto the molds and air pressure supplied to compact the glass in the blank molds and neck molds and around the plunger tips. The plungers are withdrawn by means of a piston motor 86, (Fig. 2), permitting the blanks to be partially blown in the blank molds, after which the blank molds open in the manner heretofore described, leaving the bare blanks projecting upward from and supported in the neck molds. The head 32 is then rotated, thereby swinging the blanks downward into the open blow molds which are then closed, permitting the final blowing operation.

Modifications may be resorted to within the spirit and scope of my invention.

What I claim is:

1. In a glass forming machine, the combination of a rotary mold carriage and groups of molds thereon, each group arranged with one mold in advance of the other in their direction of travel, said molds comprising horizontally separable sections, the meeting faces of the molds in a group, when closed, all being in the same plane, said plane being substantially tangent to the path of travel of the mold centers, and automatic means to open the molds of a group in succession.

2. In a glass forming machine, the combination of a rotary mold carriage and groups of molds thereon, each group arranged with one mold in advance of the other in their direction of travel, said molds comprising horizontally separable sections, the meeting faces of the molds in a group, when closed, all being in the same plane, said plane being substantially tangent to the path of travel of the mold centers, and means to open the molds of a group successively as they reach the same discharging position.

3. In a glass forming machine, the combination of a rotary mold carriage, a mold thereon comprising inner and outer sections, means to swing the outer section outward away from the axis of the mold carriage, leaving an article supported by the inner section, and means to later operate the inner section to release said article and permit its discharge.

4. In a glass forming machine, the combination of a mold comprising separable sections and a mold bottom, automatic means to move one section away from the article formed in the mold, leaving said article supported on the mold bottom, and means to then actuate the other section and cause the mold bottom to discharge the article.

5. In a glass forming machine, the combination of a mold comprising separable sections, a mold bottom held in position thereby, automatic means to withdraw one section and leave supported on said mold bottom the article formed in the mold, and means to then withdraw the other mold section and release said mold bottom, permitting it to move to a discharging position.

6. In a glass forming machine, the combination of a mold comprising horizontally separable sections, a tiltable mold bottom held in position by said sections, means to withdraw one mold section leaving the article formed in the mold supported on the mold bottom, and means to withdraw the other mold section and thereby release the mold bottom and permit it to tilt and discharge said article.

7. In a glass forming machine, the combination of a rotating carriage, a mold carried thereby comprising separable sections and a mold bottom normally held in position by the mold sections, a cam, and means actuated by the cam to withdraw one mold section at a predetermined point in the travel of the mold, leaving an article formed in the mold supported on the mold bottom and to later withdraw the other mold section.

8. In a glass forming machine, the combination of a rotating carriage, a mold carried thereby comprising separable sections and a mold bottom normally held in position by the mold sections, a cam, means actuated by the cam to withdraw one mold section at a predetermined point in the travel of the mold, leaving an article formed in the mold supported on the mold bottom and to later withdraw the other mold section, said bottom being mounted to tilt and discharge said article when the mold sections have been withdrawn, and a cam operable to return the mold bottom.

9. In a glass forming machine, the combination of a mold carriage, a pair of molds mounted thereon adjacent each other, said molds each comprising separable sections movable in a direction transverse to the travel of the molds for opening and closing the molds, means operable automatically as the molds advance, to move the outer section of the advance mold outward to release an article formed in the mold, and means to move the outer mold section of the following mold outward and release the article formed in the last mentioned mold, said movements being timed to cause the release of the articles at the same position.

10. In a glass forming machine, the combination of a mold carriage, a pair of molds mounted thereon adjacent each other, said molds each comprising separable sections movable in a direction transverse to the travel of the molds for opening and closing the molds, means operable automatically as the molds advance, to move the outer section of the advance mold outward to release an article formed in the mold, means to move the outer mold section of the following mold outward and release the article formed in the last mentioned mold, and means to cause the discharge of said articles separately after their release, said movements and the operations of the discharging means being timed to cause the articles to be discharged at the same position, said mold operating means comprising a stationary cam and operating connections between the cam and the mold sections.

11. In a glass forming machine, the combination of a rotary mold carriage, a pair of finishing molds supported thereon side by side, one in advance of the other in the direction of their travel with the carriage, means to blow articles to finished form in said molds, each of said molds comprising sections movable in a direction transverse to that of their movement with the carriage to open and close the molds, and a single actuating means operable to successively operate the mold sections and cause both molds to open and discharge the finished articles at the same position.

12. In a glass forming machine, the combination of a rotary mold carriage, a group of molds thereon comprising blank molds arranged one in advance of the other in their direction of travel and finishing molds arranged one in advance of the other in their direction of travel, a transfer device operable to simultaneously transfer the blanks from the blank molds to the finishing molds, and automatic means to discharge the finished articles one at a time at the same discharging point.

13. In a glass forming machine, the combination of a rotary mold carriage, a group of molds thereon comprising blank molds arranged one in advance of the other in the direction of their travel and finishing molds arranged below the blank molds and one in advance of the other in their direction of travel, the faces of all the molds in the group, when closed being in the same plane, a transfer head between the blank molds and the finishing molds, neck molds on said head in register with the blank molds, means to open and close the molds, means to rotate said head and thereby carry the bare blanks supported in the neck molds downward, means to close the finishing molds around the blanks, and means to successively open the finishing molds as they reach the same discharging position.

14. In a glass forming machine, a mold comprising separable sections formed with locking surfaces brought into alignment by the closing of the mold, a reciprocating frame, a locking detent thereon arranged to engage said surfaces and lock the mold in closed position when the frame is moved in one direction, and means carried by said frame to open the mold when the frame is moved in the opposite direction.

15. In a glass forming machine, a mold comprising a pair of hinged sections, lugs projecting laterally from said sections, an opening and closing device for the mold comprising a yoke, means thereon for engaging said lugs and separating the mold sections when the yoke is moved in one direction, and a locking detent carried by the yoke and operable to engage the mold sections and lock the mold in closed position when the yoke is moved in the other direction, the mold sections being formed with locking surfaces to cooperate with said detent.

16. In a glass forming machine, the combination of a plurality of molds, each comprising sections movable to and from each other for opening and closing the mold, and a single actuating device for opening the molds and for locking them in closed position, said device comprising means to engage the mold sections and swing them to open position when the device is moved in one direction, said device comprising locking members to engage and lock the molds in closed position when said device is moved in the reverse direction.

17. In a glass forming machine, the combination of a series of groups of finishing molds, each group comprising separate molds, each mold having separable hinged sections, the molds arranged with their opening edges in juxtaposition.

18. In a glass forming machine, the combination of a series of groups of blank molds, each group comprising separate molds, each mold having separable hinged sections, the molds arranged with their opening edges in juxtaposition.

19. In a glass forming machine, the combination of a series of groups of blank molds and a complementary group of finishing molds, each of said groups consisting of separate molds, each mold having separable hinged sections, the molds of each group being arranged with their opening edges in juxtaposition.

20. In a glass forming machine, the combination of a rotary mold carriage, a group of blank molds thereon, a complementary group of finishing molds thereon cooperating with the blank molds and spaced vertically therefrom, a single transfer member between said groups, and means controlled by the movement of the carriage and automatically operating periodically to simultaneously transfer parisons from all the said blank molds to the finishing molds without interrupting the movement of the mold carriage.

21. The combination of a group of inverted blank molds open at their upper ends to receive charges of molten glass, a group of neck molds in register with the lower ends of the inverted blank molds, a group of finishing molds beneath the neck molds, a single transfer member on which said neck molds are supported, automatic means to rotate said member while the parisons are supported in the neck molds and thereby swing the neck molds downward and into register with the finishing molds and transfer the parisons from the blank molds to the finishing molds, a piston motor carried by said member, and neck pins connected to the motor piston and movable thereby into and out of the neck molds.

22. In a glass forming machine, the combination of a body mold having separable sections mounted to swing about a common axis and a neck mold in register with the body mold and having separable sections mounted to swing about an axis parallel with said first mentioned axis, the meeting faces of the body mold sections being in a plane substantially perpendicular to the meeting faces of the neck mold sections.

23. In a glass forming machine, the combination of a mold carriage rotatable about a vertical axis, a group of molds thereon, each comprising separable sections, the meeting faces of all of said sections being in the same plane substantially tangent to the path of movement of the mold centers, a stationary cam, and operating connections between the cam and the molds for separately opening the molds one after the other.

24. In a glass forming machine, the combination of a rotary mold carriage, a series of groups of blank molds thereon, a series of complementary groups of finishing molds thereon cooperating with the respective groups of blank molds and spaced vertically from the blank molds, and a single transfer member between and common to each cooperating group of blank and finishing molds controlled by the movement of the carriage and automatically operating periodically to simultaneously move all the parisons from one group of blank molds to the cooperating group of finishing molds, without interrupting the movement of the mold carriage.

Signed at Toledo, in the county of Lucas and State of Ohio, this 10th day of November, 1920.

LEONARD D. SOUBIER.